(12) United States Patent
Zha et al.

(10) Patent No.: US 12,162,811 B2
(45) Date of Patent: Dec. 10, 2024

(54) F-18 LABELED CHIRAL PURE DERIVATIVE OF HYDROXYFURAN, PREPARATION METHOD AND USE THEREOF

(71) Applicant: The First Affiliated Hospital of Sun Yat-sen University, Guangzhou (CN)

(72) Inventors: Zhihao Zha, Guangzhou (CN); Xiangsong Zhang, Guangzhou (CN); Renbo Wu, Guangzhou (CN); Jianbo Liu, Guangzhou (CN)

(73) Assignee: The First Affiliated Hospital of Sun Yat-sen University, Guangzhou (CN)

( * ) Notice: Subject to any disclaimer, the term of this patent is extended or adjusted under 35 U.S.C. 154(b) by 0 days.

(21) Appl. No.: 18/201,806

(22) Filed: May 25, 2023

(65) Prior Publication Data

US 2024/0182381 A1 Jun. 6, 2024

(30) Foreign Application Priority Data

Nov. 24, 2022 (CN) .......................... 202211479508.5

(51) Int. Cl.
*C07B 59/00* (2006.01)

(52) U.S. Cl.
CPC .................... *C07B 59/002* (2013.01)

(58) Field of Classification Search
CPC .................................................. C07B 59/002
USPC ....................................................... 424/1.89
See application file for complete search history.

(56) References Cited

U.S. PATENT DOCUMENTS

| | | | |
|---|---|---|---|
| 4,043,937 A | 8/1977 | Kiss et al. | |
| 2021/0283095 A1 | 9/2021 | Siess | |

FOREIGN PATENT DOCUMENTS

| | | |
|---|---|---|
| CN | 109922837 A | 6/2019 |
| CN | 112386949 A | 2/2021 |
| CN | 112807276 A | 5/2021 |
| CN | 114736112 A | 7/2022 |
| CN | 114989166 A | 9/2022 |

OTHER PUBLICATIONS

Chiotellis et al. Eur. J. Med. Chem. 70 (2013) 768-780. (Year: 2013).*
Patt et al. J. Radioanal. Nucl. Chem. 240, 3, (1999) 925-927. (Year: 1999).*
RN 142474-58-6, STN, entered 1992. (Year: 1992).*
Kothari et al. Radiochimica Acta 77, 87-90 (1997). (Year: 1997).*
Tang et al. Nucl. Med. Biol. 32 (2005) 553-558. (Year: 2005).*
Fumihiko Yamamoto, et al., Positron Labeled Antioxidants: Synthesis and Tissue Biodistribution of 6-Deoxy-6-[18F]fluoro-L-ascorbic Acid, International Journal of Radiation Applications and Instrumentation Part A., Applied Radiation and Isotopes, 1992, pp. 633-639, vol. 43, No. 5.
Zhoulei Li, et al., Increased Tumoral Microenvironmental pH Improves Cytotoxic Effect of Pharmacologic Ascorbic Acid in Castration-Resistant Prostate Cancer Cells, Frontiers in Pharmacology, 2020, pp. 1-12, vol. 11, Article 570939.
Peng He, et al., Ascorbic acid analogue 6-Deoxy-6-[18F] fluoro-L-ascorbic acid as a tracer for identifying human colorectal cancer with SVCT2 overexpression, Translational Oncology, 2021, pp. 1-8, vol. 14, 101055.
Janusz Madaj, et al., 6-Deoxy-6-fluoro-L-ascorbic acid: crystal structure and oxidative degradation, Carbohydrate Research, 2000, pp. 477-485, vol. 329.
Fumihiko Yamamoto, et al., Positron-Labeled Antioxidant 6-Deoxy-6-[18F] Fluoro-L-Ascorbic Acid: Increased Uptake in Transient Global Ischemic Rat Brain, Nuclear Medicine & Biology, 1996, pp. 479-486, vol. 23.
Joseph Kiss, et al., Synthesis and Properties of 6-Deoxy-6-halogeno-Derivatives of L-Ascorbic Acid, Helvetica Chimica Acta, 1980, pp. 1728-1739, vol. 63, No. 6.
Steven C. Rumsey, et al., Specificity of Ascorbate Analogs for Ascorbate Transport, Synthesis and Detection of [125I]6-Deoxy-6-Iodo-L-Ascorbic Acid and Characterization of its Ascorbate-Specific Transport Properties, The Journal of Biological Chemistry, 1999, pp. 23215-23222, vol. 274, No. 33.

* cited by examiner

*Primary Examiner* — Michael G. Hartley
*Assistant Examiner* — Sean R Donohue
(74) *Attorney, Agent, or Firm* — True Shepherd LLC; Andrew C. Cheng

(57) ABSTRACT

An F-18 labeled chiral pure derivative of hydroxyfuran, a preparation method and use thereof were provided. (4R, 5R)[$^{18}$F]FAA provided by the present disclosure is a chiral pure radioactive compound, and three other chiral pure [$^{18}$F]FAA structural formulae are also provided by the present disclosure. The present disclosure provides a chiral pure radioactive probe (4R, 5R)[$^{18}$F]FAA, which shows unique tumor diagnostic efficiency and similar distribution to AA, and can be used for early diagnosis of tumors, pathological studies, assessment of disease progression, and evaluation for efficacy.

5 Claims, 14 Drawing Sheets

Residence Time (Mean ± SD, hours, n = 6) of (4R, 5R)-[18F]FAA for Measured Source Organs

| Organs | Residence Time (Hours) |
|---|---|
| Adrenals | 1.00E-03±5.00E-04 |
| Brain | 3.00E-03±1.06E-03 |
| Breasts | 7.41E-04±8.16E-04 |
| Gallbladder Wall | 4.82E-04±3.67E-04 |
| LLI Wall | 2.59E-03±1.53E-03 |
| Small Intestine | 2.61E-03±1.05E-03 |
| Stomach | 8.80E-03±4.45E-03 |
| ULI Wall | 3.31E-03±1.30E-03 |
| Heart Wall | 4.15E-03±1.51E-03 |
| Kidneys | 1.77E-02±5.30E-03 |
| Liver | 2.25E-01±4.94E-02 |
| Lungs | 3.18E-02±4.93E-03 |
| Muscle | 8.28E-03±2.62E-03 |
| Ovaries* | 2.24E-04±1.32E-04 |
| Pancreas | 3.94E-03±2.49E-03 |
| Red Marrow | 1.63E-04±1.02E-04 |
| Bone Surfaces | 8.97E-03±9.51E-03 |
| Spleen | 2.19E-02±1.59E-02 |
| Testes* | 1.10E-03±1.32E-03 |
| Thymus | 2.74E-05±1.32E-05 |
| Thyroid* | 8.14E-04±5.31E-04 |
| Urinary Bladder Wall | 1.16E-02±5.35E-03 |
| Uterus* | 1.75E-03±1.35E-03 |
| Total body | 9.87E-01±2.75E-01 |

LLI Wall(Lower large intestine wall); ULI Wall(Upper large intestine wall)

FIG. 11

Radiation Dose Estimates of ⁽⁴R, 5R⁾ [18F]FAA (Mean ± SD, mGy/MBq*, n = 6)

| Target Organs | Radiation Dose |
|---|---|
| Adrenals | 1.89E-02±6.13E-03 |
| Brain | 4.88E-03±1.21E-03 |
| Breasts | 5.26E-03±1.16E-03 |
| Gallbladder Wall | 1.21E-02±2.96E-03 |
| LLI Wall | 7.70E-03±1.46E-03 |
| Small Intestine | 7.51E-03±1.72E-03 |
| Stomach | 1.06E-02±3.26E-03 |
| ULI Wall | 8.43E-03±1.80E-03 |
| Heart Wall | 9.66E-03±1.85E-03 |
| Kidneys | 1.87E-02±3.83E-03 |
| Liver | 3.42E-02±7.47E-03 |
| Lungs | 1.17E-02±2.18E-03 |
| Muscle | 5.60E-03±1.43E-03 |
| Ovaries* | 1.01E-02±2.09E-03 |
| Pancreas | 1.68E-02±5.61E-03 |
| Red Marrow | 6.10E-03±1.55E-03 |
| Bone Surfaces | 6.25E-03±1.67E-03 |
| Spleen | 2.95E-02±1.70E-02 |
| Testes* | 1.02E-02±6.65E-03 |
| Thymus | 5.96E-03±1.49E-03 |
| Thyroid* | 1.14E-02±2.59E-03 |
| Urinary Bladder Wall | 1.16E-02±3.77E-03 |
| Uterus* | 1.01E-02±3.01E-03 |
| Total body | 6.54E-03±1.58E-03 |
| ED(mSv/MBq) | 1.68E-02±3.59E-03 |

*To obtain the dose estimates in rad/mCi, multiply by 3.7.
ED = effective dose.

FIG. 12

F-18 LABELED CHIRAL PURE DERIVATIVE OF HYDROXYFURAN, PREPARATION METHOD AND USE THEREOF

CROSS REFERENCE TO THE RELATED APPLICATIONS

This application is based upon and claims priority to Chinese Patent Application No. 202211479508.5, filed on Nov. 24, 2022, the entire contents of which are incorporated herein by reference.

TECHNICAL FIELD

The present disclosure belongs to the field of drug synthesis technology, and specifically relates to a novel radionuclide-labeled probe and a preparation method thereof, especially to an F-18-labeled chiral pure derivative of hydroxyfuran, a preparation method and use thereof.

BACKGROUND

L-ascorbic acid (AA) is considered to have an antitumor effect and is clinically studied, but it is not effective in all tumors. There is a need to find a precision screening tool for screening for AA-sensitive tumors. Molecular imaging technology can provide a non-invasive method to effectively monitor biomolecules at a cellular or subcellular level, and is a visual precision screening tool. Among the available molecular imaging techniques, a positron tomography emission imaging (PET) is considered to be an ideal tool. In recent years, a radionuclide ($^{18}$F, $^{125}$I, $^{131}$I, $^{11}$C, $^{14}$C) labeling technique has been applied to study related compounds structurally similar to AA, and the $^{18}$F-labeled structural analogs of AA are good molecular probes for PET.

The study of Rumsey et al. showed that one of the structural requirements for AA and analogs thereof to be shipped in cells is that the C-4 position of the five-membered reducing ring has an S-absolute conformation, while the C-2 and C-3 positions are not substituted. By studying 5-O-(4-[125I]iodobenzyl)-L-ascorbic acid, it was found that introduction of a large substituent, such as iodobenzoxy, at the C-5 position on AA does not allow the compound to maintain well the distribution properties specific to AA itself in vivo. In contrast, by the introduction of radioisotopes such as $^{18}$F and $^{131}$I at the C-6 position of AA, the imaging showed that it has the expected distribution in tissues and organs of a rodent such as the adrenal gland, thus indicating that the compound with the substituent introduced at the C-6 site is suitable as a radiotracer. Since 6-halo-L ascorbic acid is highly similar to natural AA in terms of atomic coordinates, bond lengths and angles, hydrogen coordinates, anisotropy and isotropic displacement parameters and the like, the radiochemically synthesized $^{18}$F-labeled 6-halo-L-ascorbic acid provides a positron tracer with biochemical functions highly similar to those of AA for visualizing and studying the course of action of AA in vivo and in vitro.

The synthesis method of [$^{18}$F] 6-F-ascorbic acid ([18F] DFA), a positron tracer similar to AA, has been reported abroad, but its labeling method suffers from the drawbacks of long labeling time (90 min) and low efficiency (4.9-15.6%). In addition, the literature shows that the reported molecular probe [$^{18}$F]DFA is not separated in terms of the chirality at the C-6 position in the molecular structure, indicating that [$^{18}$F]DFA is a mixture with multiple conformations and thus its biological properties also differ from those of a chiral pure ascorbic acid. The literature indicates that the labeling yield of [$^{18}$F]DFA is low and its biological properties in mice are average, so no automated preparation has been reported and no subsequent clinical trials have been performed.

SUMMARY

The present disclosure has prepared a chiral pure L-ascorbic acid $^{18}$F marker (4R, 5R)[$^{18}$F]FAA and three other chiral pure spin isomers, and achieved labeling with F-18 on an All-in-one automated synthesizer with a labeling yield of about 30% (not rectified). Preclinical biological data showed certain tumor uptake of (4R, 5R)[$^{18}$F]FAA in a tumor-bearing mice. Data from clinical studies showed that (4R, 5R)[$^{18}$F]FAA exhibited average tumor radioactivity uptake in kidney cancer and intestinal cancer patients, but unexpectedly, (4R, 5R)[$^{18}$F]FAA was excellent in detecting thyroid cancer and lung cancer, with very high uptake in both primary and metastatic tumor foci.

The present disclosure uses a two-step labeling method to synthesize chiral pure L-ascorbic acid analogue radioactive compound (4R, 5R)[$^{18}$F]FAA, enabling it to be used for the study of AA distribution in a human body, tumor diagnosis, and radiometrics.

The present disclosure provides a chiral pure L-ascorbic acid analogue radioactive compound (4R, 5R)[$^{18}$F]FAA having the structural formula represented by formula (I):

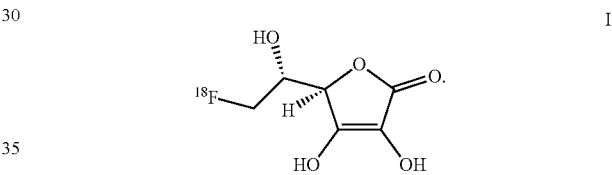

I

The present disclosure also provides (4R, 5R)[$^{18}$F]FAA in three other configurations, as represented by formula (III):

III

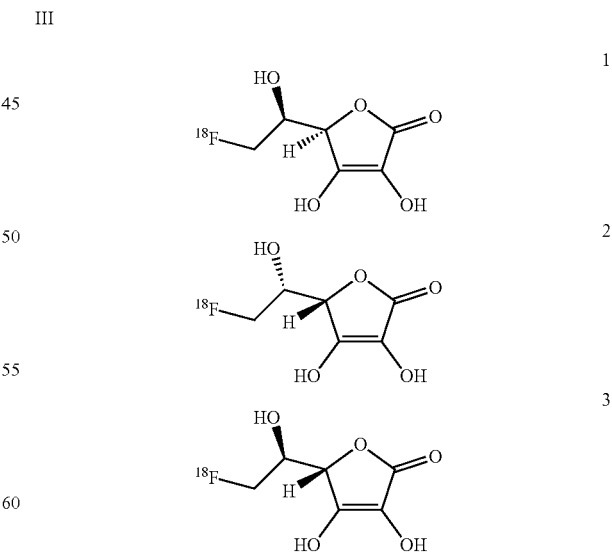

A further aspect of the present disclosure provides a preparation method for the above-mentioned chiral pure L-ascorbic acid analogue radioactive compound (4R, 5R)[$^{18}$F]FAA, including:

Scheme II

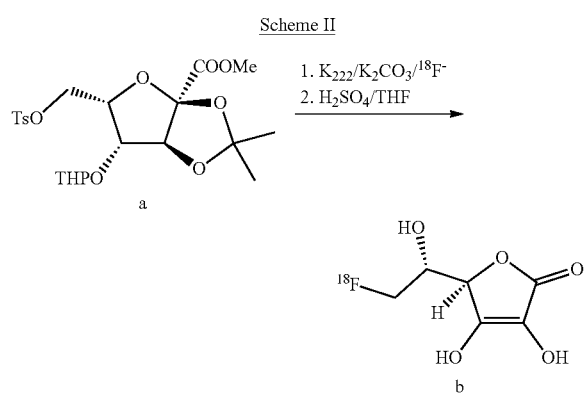

1) dissolving the compound a shown in the Scheme II in anhydrous acetonitrile to obtain the precursor-containing anhydrous acetonitrile;
2) mixing the precursor-containing anhydrous acetonitrile with a K2.2.2/$K_2CO_3$ solid having $^{18}F$, then heating the mixture at 80° C. for 10 min, blowing out the solvent with nitrogen at 110° C., and then, adding tetrahydrofuran as well as a concentrated acid to a reaction flask and heating the reactants at 110° C. for 10 min to obtain the labeled solution; the tetrahydrofuran: the concentrated acid=1:1; the concentrated acid being a concentrated sulfuric acid or a concentrated hydrochloric acid;
3) after completion of the reaction, cooling the labeled solution to 0° C. in an ice water bath, adding 1 N of sodium hydroxide solution to the labeled solution until the pH is between 3-4, or mixing with PBS to obtain a mixed solution;
4) separating the mixed solution using an alumina solid phase extraction column and/or a semi-preparative column to obtain the radioactive compound; the separation is carried out with pH 3.6, 50 mM sodium acetate solution as a mobile phase at a flow rate of 3 mL/min.

In an embodiment according to the present disclosure, the preparation method is done manually or by automation based on the AllinOne module.

In an embodiment according to the present disclosure, the compound a: anhydrous acetonitrile=20:3 in the step 1) in mg:mL.

In an embodiment according to the present disclosure, the K2.2.2/$K_2CO_3$ solid having $^{18}F$ is obtained by adsorption of $^{18}F$ on a QMA solid phase extraction column and then eluting the QMA solid phase extraction column with a elution solution to collect a K2.2.2/$K_2CO_3$ solution having $^{18}F$, which is then distilled off azeotropically with anhydrous acetonitrile by heating under nitrogen flow; the elution solution is obtained by dissolving 10 mg K2.2.2 and 1.8 mg $K_2CO_3$ in 0.84 mL anhydrous acetonitrile and 0.16 mL water; the K2.2.2: $K_2CO_3$: anhydrous acetonitrile: water=250:45:21:4 in mg:mg:mL:mL.

In an embodiment according to the present disclosure, the method further includes upon obtaining (4R, 5R)[$^{18}F$]FAA, determination of purity in high performance liquid chromatography (Radio-HPLC) with a radioactive detector.

In an embodiment according to the present disclosure, the determination of purity includes:
the first mobile phase being an 0.1% aqueous solution of trifluoroacetic acid, the second mobile phase being an acetonitrile solution, and the following gradient elution conditions: 0~15 min, 95% of the first mobile phase, 5% of the second mobile phase; the flow rate of the mobile phase being 1 mL/min.

The present disclosure further provides a composition for diagnostic or assay use including the [$^{18}F$]FAA compound described above.

The present disclosure further provides the use of the above [$^{18}F$]FAA compound in the preparation of a reagent or a medication for tracking the distribution of L-ascorbic acid in the human body, in tumor diagnosis or in radiometrics.

Another aspect of the present disclosure provides the use of the above-mentioned chiral pure AA analogue radioactive compounds (4R, 5R) [$^{18}F$]FAA in the study of AA distribution in the human body, the tumor diagnosis and the radiometrics.

The beneficial effects of the above technical solutions of the present disclosure are as follows:

The present disclosure provides a radioactive probe (4R, 5R)[$^{18}F$]FAA, an analogue of AA, which is a chiral pure compound and can be used in the study of the distribution of AA in the human body, the tumor diagnosis, and radiometrics.

BRIEF DESCRIPTION OF THE DRAWINGS

FIG. 11 shows the residence time table of (4R, 5R) [$^{18}F$]FAA in the major organs in Example 7 of the present disclosure.

FIG. 12 shows the radiation dose estimated table for the major organs in Example 7 of the present disclosure.

DESCRIPTION OF THE SYMBOLS IN THE FIGURES 1-18 First-18th three-way valve; 19-25 First-seventh solenoid valve;
26 Three-way solenoid valve; 27 $^{18}F$ transfer tube switch;
28 $^{18}O$ water collection bottle; 29 Reactor with heating function;
30 Sterile product bottle; 31 Waste liquid bottle;
32 Sterile filter membrane; 33 Ventilated filter membrane;

34 QMA solid phase extraction column; 35 Syringe to assist in loading a reagent from reagent bottles;
36 Alumina solid phase extraction column; 37 HPLC system;
38 Injection cartridge loaded with $^{18}$F ions; 39 Semi-preparative columns; in HPLC;
40 Six-way valve in HPLC
A Syringe loaded with K2.2.2/K$_2$CO$_3$ solution; B Buffer vial loaded with buffer solution;
C Reagent bottle loaded with precursors; D Reagent bottle loaded with tetrahydrofuran and concentrated hydrochloric acid
E Reagent bottle containing VitC; F Water bag

DETAILED DESCRIPTION OF THE EMBODIMENTS

In order to make the technical problem, the technical solution and advantages to be solved by the present disclosure clearer, they will be described in detail below with the accompanying drawings and specific examples.
Terms and Definitions
ACN, Anhydrous Acetonitrile,
PBS, phosphate buffer saline solution
Reaction scheme

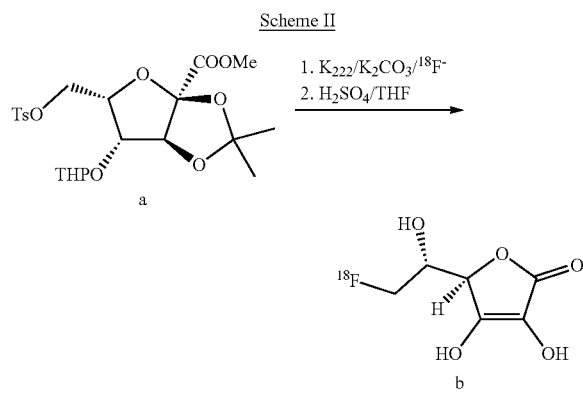

Example 1: Manual Preparation of (4R, 5R)[$^{18}$F]FAA 2 mg of the precursor, i.e. a compound a shown in Scheme (II), was dissolved in 0.3 mL of ACN; 10 mg of K2.2.2 and 1.8 mg of K$_2$CO$_3$ were dissolved in 0.84 mL of ACN and 0.16 mL of water to prepare a elution solution; 99 mg of sodium acetate and 1.429 g of acetic acid was dissolved in 500 ml of water to obtain a 50 mM sodium acetate solution with a pH of 3.6; 10 mL of The QMA column was activated with 10 ml of 1 M NaHCO$_3$ and 10 mL of ddH$_2$O; the $^{18}$F-solution was passed over the QMA, and then the QMA was eluted with the elution solution, and the eluate was collected, the solvent was blown out with nitrogen at 110° C., 1 mL of anhydrous acetonitrile was added, and the solvent was removed under the same conditions and repeated twice. Anhydrous acetonitrile containing the precursor was added to the labeling reaction flask, heated at 80° C. for 10 min, and the solvent was dried out with nitrogen at 110° C. 0.3 mL of tetrahydrofuran and 0.3 mL of concentrated sulfuric acid were added to the reaction flask, heated at 110° C. for 10 min, and cooled to 0° C. in an ice water bath. 1 N of sodium hydroxide solution was added to the labeling solution until the pH was between 3-4. The mixed solution was separated using a semi-preparative column, in which the mobile phase is 50 mM sodium acetate solution at pH 3.6

Example 2: Automated Preparation of (4R, 5R)[$^{18}$F]FAA

Figure 1:
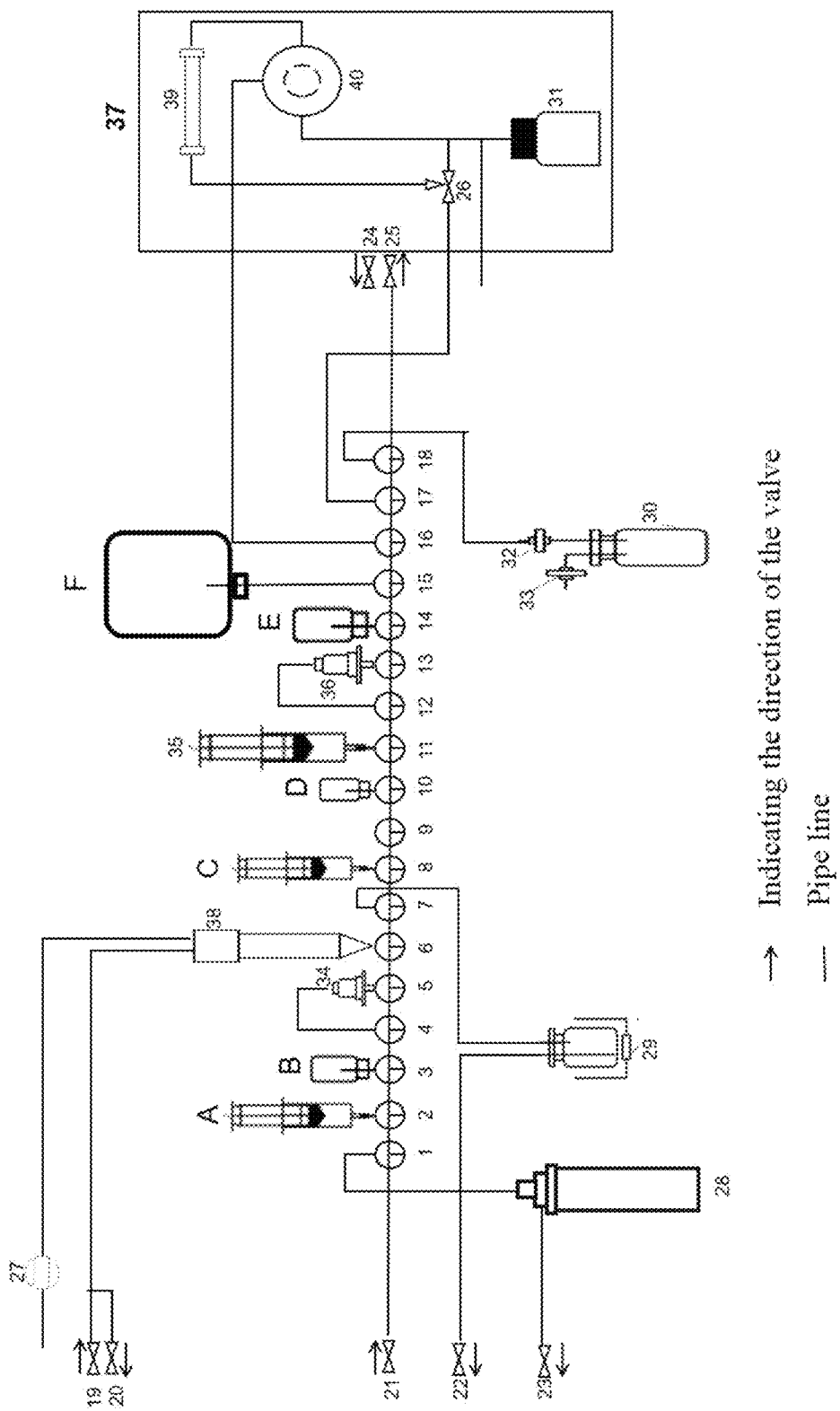
FIG. 1 shows a schematic diagram of the structure of the automated synthesis device of Embodiment 2 according to Example 2 of the present disclosure.

The (4R, 5R) [$^{18}$F]FAA was synthesized on the AllinOne module as shown in FIG. 1. The radioactive $^{18}$F$^-$ ions produced by an accelerator were transferred to the QMA solid-phase extraction column 34 by nitrogen gas. The K2.2.2/K$_2$CO$_3$ solution is injected by a syringe (A) loaded with K2.2.2/K$_2$CO$_3$ solution and $^{18}$F$^-$ was eluted from the QMA solid phase extraction column 34 into the heated reactor 29, where the water is removed by evaporation under open conditions.

0.6 mL of acetonitrile solution containing 3 mg of cyclic sulfate compound 1 was added to the heated reactor 29 with the heating function through the reagent bottle (C) loaded with the precursor and heated to 110° C. for 10 min.

Figure 2:
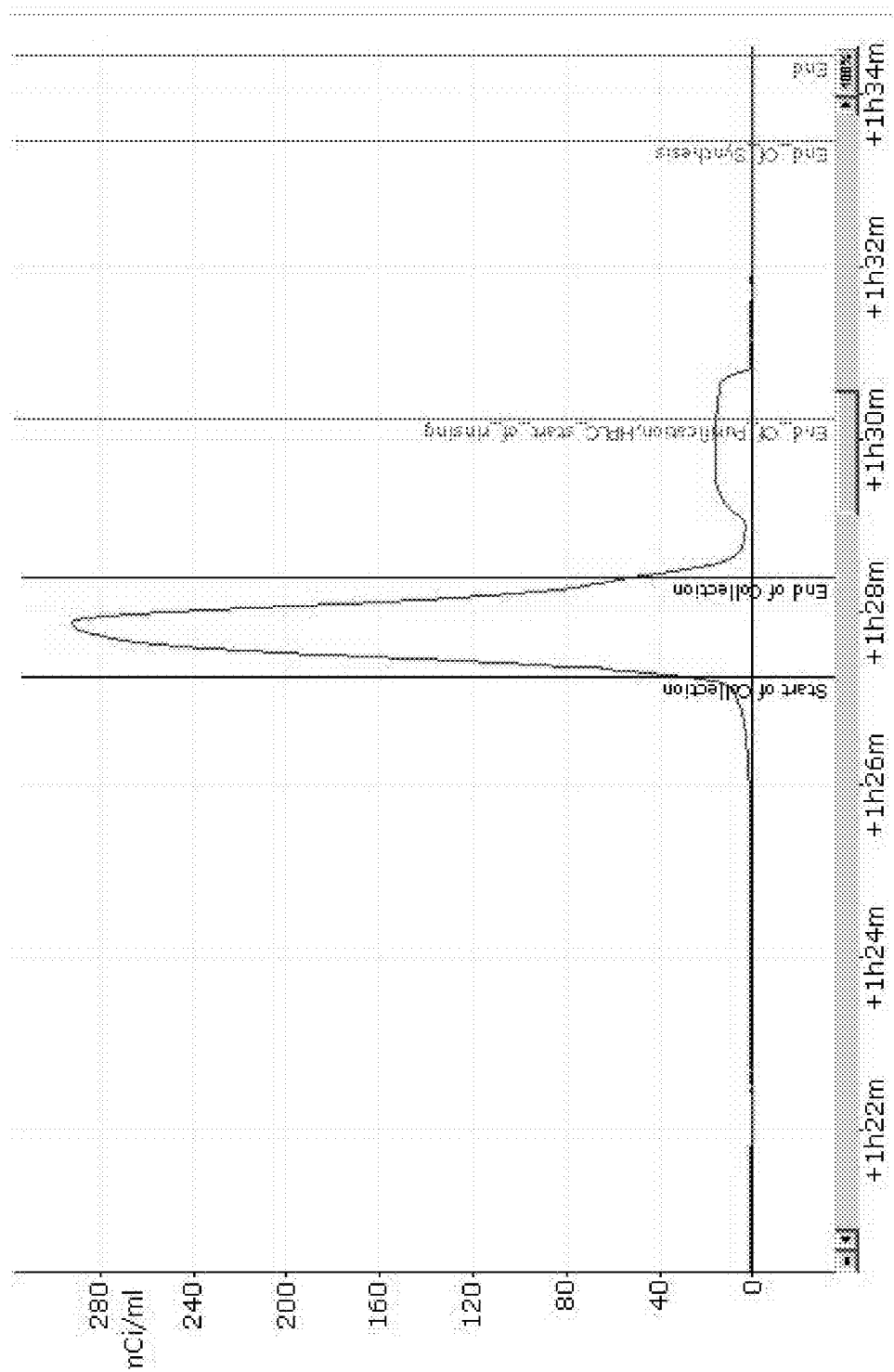
FIG. 2 shows the HPLC spectrum of the semi-prepared product prepared according to Example 2 of the present disclosure.

The acetonitrile was removed by evaporation under open conditions, and 0.6 mL of tetrahydrofuran and concentrated hydrochloric acid (V:V=1:1) was added to react at 110° C. for 10 min. PBS was added to the reactor 29 with heating function through the buffer bottle (B) loaded with buffer solution, and the mixture was separated on a semi-preparative column 39 in HPLC after transferring it through an aluminum oxide solid phase extraction column 36 where the separation column was a C18 column, the mobile phase was a mixture of sodium acetate and glacial acetic acid, and the flow rate is 3 mL/min. The semi-preparative effect graph is shown in FIG. 2. The highest radioactive peak was the target product, and the liquid at this peak was collected to the sterile product bottle 30 thereby obtaining a product having a high purity and high specific activity.

Figure 3:
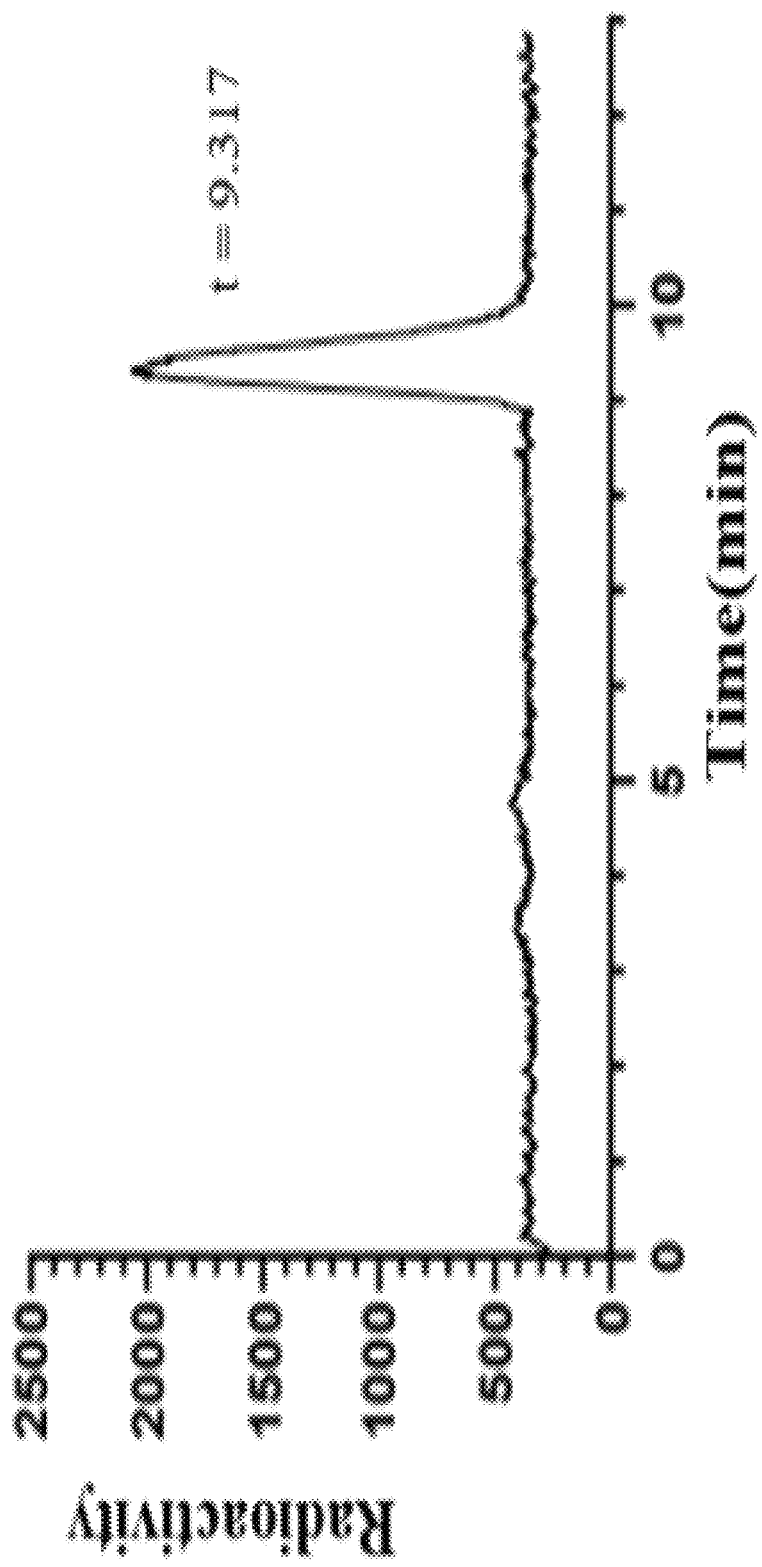
FIG. 3 shows the HPLC spectrum of the synthesized product (4R, 5R) [$^{18}F$]FAA prepared according to Example 2 of the present disclosure.
Figure 4:
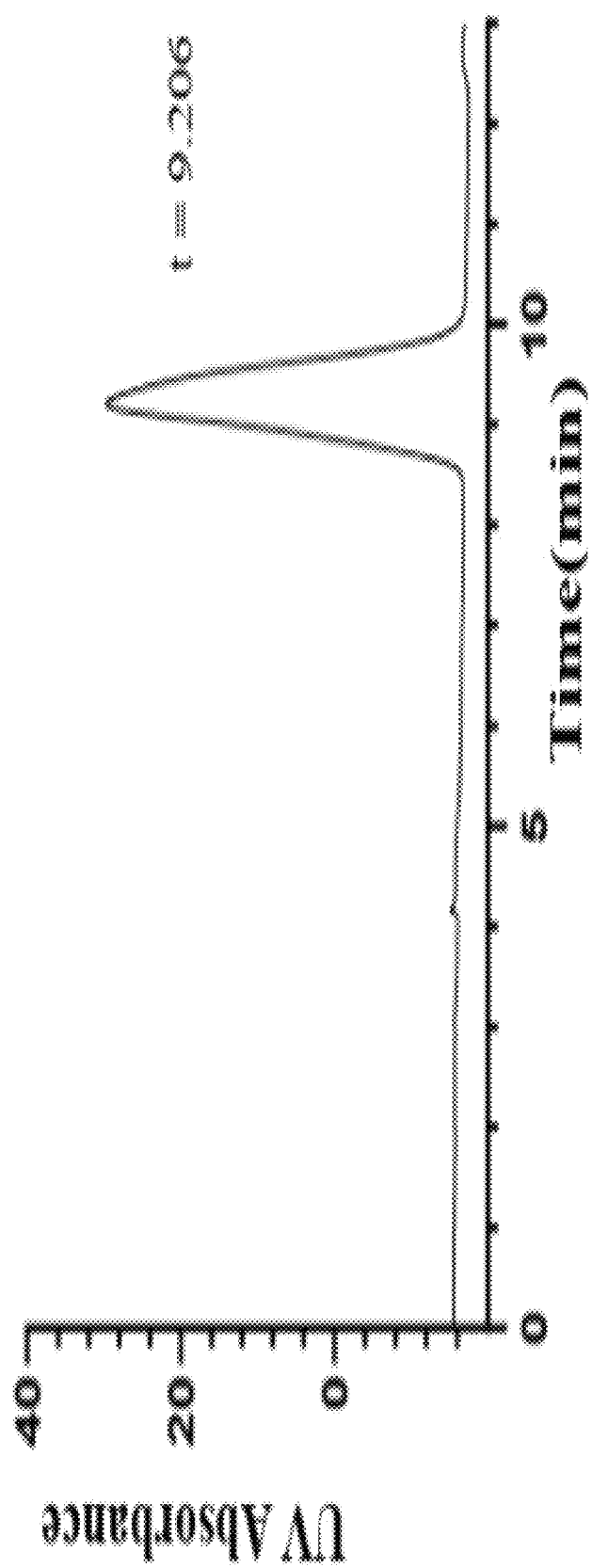
FIG. 4 shows the HPLC spectrum of (4R, 5R)[$^{19}F$]FAA according to Examples 2 and 3 of the present disclosure.

The product was obtained by adding the VitC antioxidant to the purified product through the reagent bottle E loaded with VitC and passing through the sterile filter membrane 32. The preparation time duration was 40 min and the synthesis efficiency was 30%. The HPLC results of the synthesized product are shown in FIG. 3 with a retention time of 9.317 min and purity of >95%. The HPLC results of the cold compound (4R, 5R)[$^{18}$F]FAA are shown in FIG. 4, with a residue time of 9.206 min. The residue time of the product and (4R, 5R)[$^{19}$F]FAA on HPLC were in general agreement, proving that the synthesized product was indeed (4R, 5R)[$^{18}$F]FAA.

Example 3: Synthesis of (4R, 5R)[$^{19}$F]FAA

Figure 5:
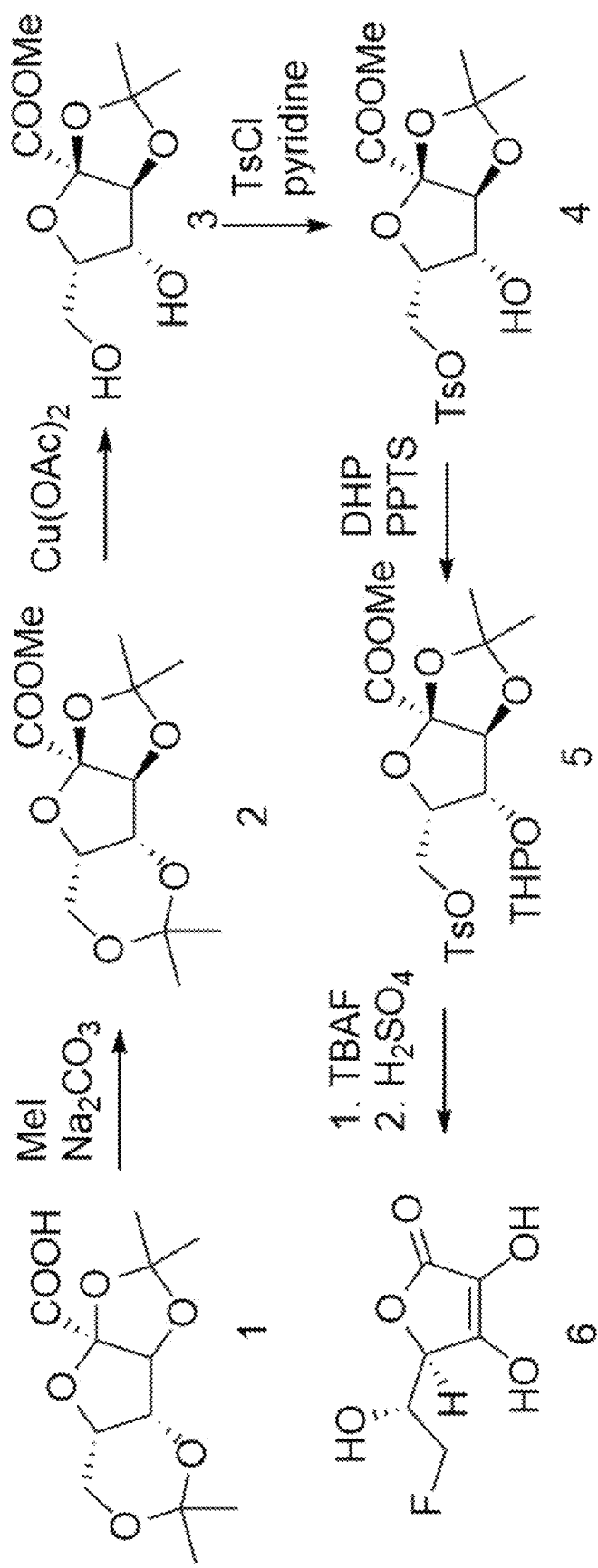
FIG. 5 shows a synthetic route of (4R, 5R)[$^{19}F$]FAA according to Example 3 of the present disclosure.

The synthesis route is shown in FIG. 5. Compound 2: Compound 1 (5 g, 17 mmol) was dissolved in 50 mL of anhydrous dimethylformamide, and iodomethane (4.8 g, 34 mmol) and potassium carbonate (3.5 mg, 25.5 mmol) were added sequentially to the mixed solution. After the reaction at room temperature overnight, 300 mL of ethyl acetate was added and washed with water (50 mL×2) and saturated salt water (50 mL). The organic phase was dried with anhydrous magnesium sulfate and filtered to remove solid impurities. The organic phase was removed from the filtrate using a rotary evaporator under reduced pressure and separated on a silica gel column with ethyl acetate/petroleum ether (v/v, 2/8), the target fraction was collected and the solvent was removed under reduced pressure to give 4 g of a pale yellow oil (yield: 82%).

Compound 3: Compound 2 (2 g, 6.9 mmol) was dissolved in 20 mL of anhydrous dimethylformamide and copper acetate (20 mg, 2 mmol) was added to the mixed solution. Heat and reflux were conducted for 30 min. After cooling to room temperature, the solvent was removed under reduced pressure using a rotary evaporator and separated by ethyl acetate/petroleum ether (v/v, 7/3) over a silica gel column, and the target fraction was collected and the solvent was removed under reduced pressure to give 1.1 g of a pale yellow oil (yield: 64%).

Compound 4: Compound 3 (500 mg, 2 mmol) was dissolved in 10 mL of pyridine and p-toluenesulfonyl chloride (380 mg, 2 mmol) was added to the mixture and stirred for 2 h at room temperature. The organic phase was removed by rotary evaporator under reduced pressure and separated on a silica gel column with ethyl acetate/petroleum ether (v/v, 3/7), the target fraction was collected and the solvent was removed under reduced pressure to give 506 mg of a pale yellow oil (yield: 63%).

Compound 5: Compound 4 (500 mg, 1.24 mmol) was dissolved in 10 mL of anhydrous dichloromethane, and 3,4-dihydropyranone (210 mg, 2.5 mmol) and pyridine-p-toluenesulfonate (62 mg, 0.25 mmol) were added sequentially to the mixed solution. After the reaction overnight at room temperature, the organic phase was removed under reduced pressure using a rotary evaporator and separated on a silica gel column with ethyl acetate/petroleum ether (v/v, 2/8), and the target fraction was collected and the solvent was removed under reduced pressure to give 337 mg of a pale yellow oil (yield: 56%).

Compound 6: Compound 5 (100 mg, 0.21 mmol) was dissolved in 5 mL of tetrahydrofuran, and tetrabutylammonium fluoride solution (1 M, 0.5 mL) was added to the mixed solution and stirred at room temperature overnight. Subsequently, 5 mL of 40% sulfuric acid was added and heated to reflux for 2 hours. After cooling to room temperature, the organic phase was extracted using ethyl acetate (10 mL×3), combined, and the organic solvent was removed under reduced pressure using a rotary evaporator. The resultant was separated on a silica gel column using dichloromethane/methanol/acetic acid (v/v/v, 6/1/1), and the target fraction was collected, and the solvent was removed under reduced pressure to give 12 mg of a pale yellow oil (yield: 31%).

Example 4: Use of (4R, 5R)[18F]FAA for Micro-Pet/Ct Dynamic Imaging of the Tumor-Bearing Mice With Different Injection Manners A nude mouse model with HCT8 xenograft tumor was established, and dynamic imaging was performed after intratumoral injection upon anesthesia of the tumor-bearing mice: 0.1 mL (about 100 μCi) of the solution prepared automatically with saline dilution with or without supersaturated sodium ascorbate was taken from a 1 mL syringe needle, and the solution was injected intratumorally into the nude mice model with an automatic syringe pump at 0.1 mL/min, and a dynamic 1-h microPET/CT imaging was performed. Delayed imaging was performed: statically imaged 2 h after injection.

Figures 6A, 6B:
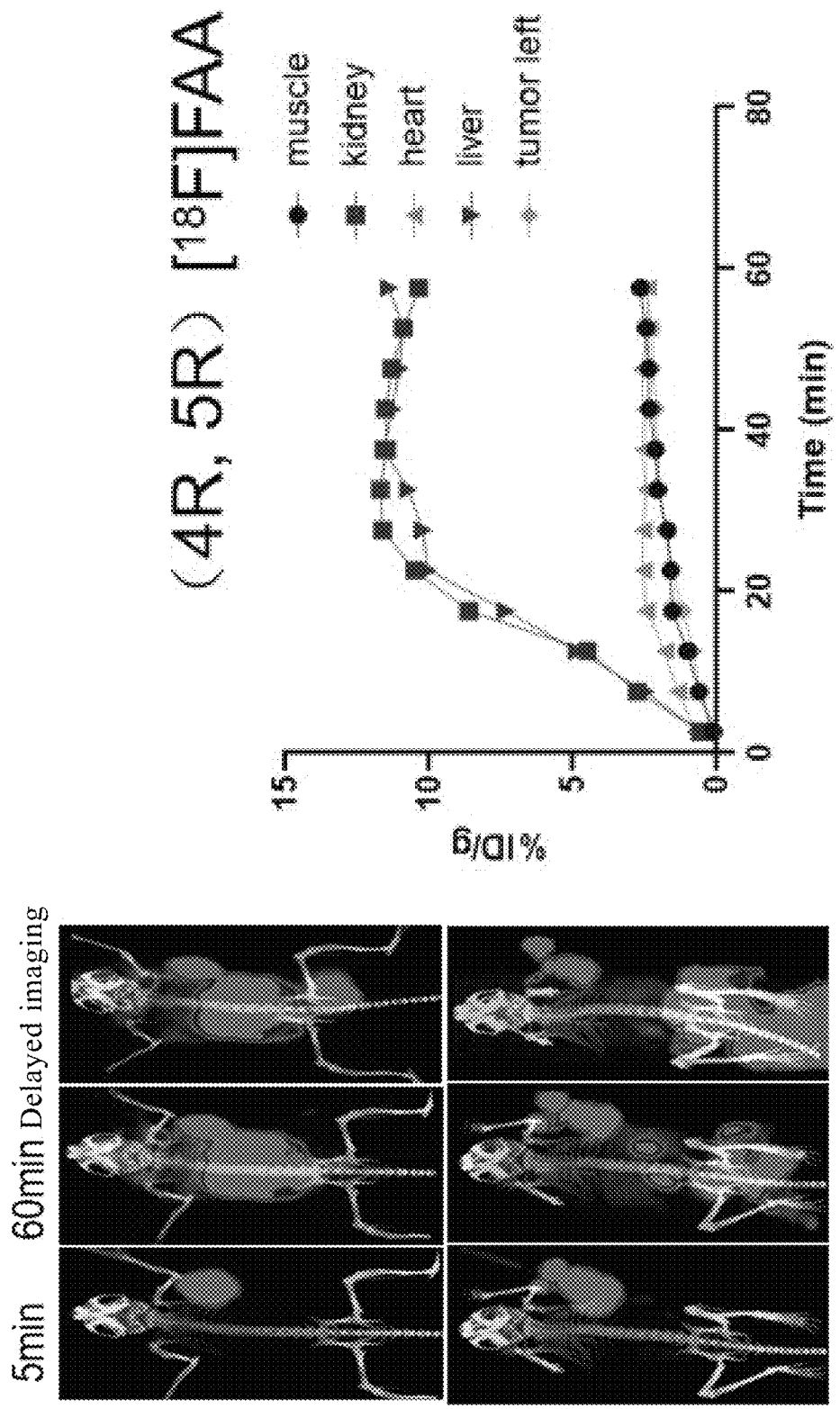
FIGS. 6A-6C show the graphs of dynamic imaging and delayed imaging upon intratumoral injection in the tumor-bearing mice in Example 4 of the present disclosure.
Figure 6C:
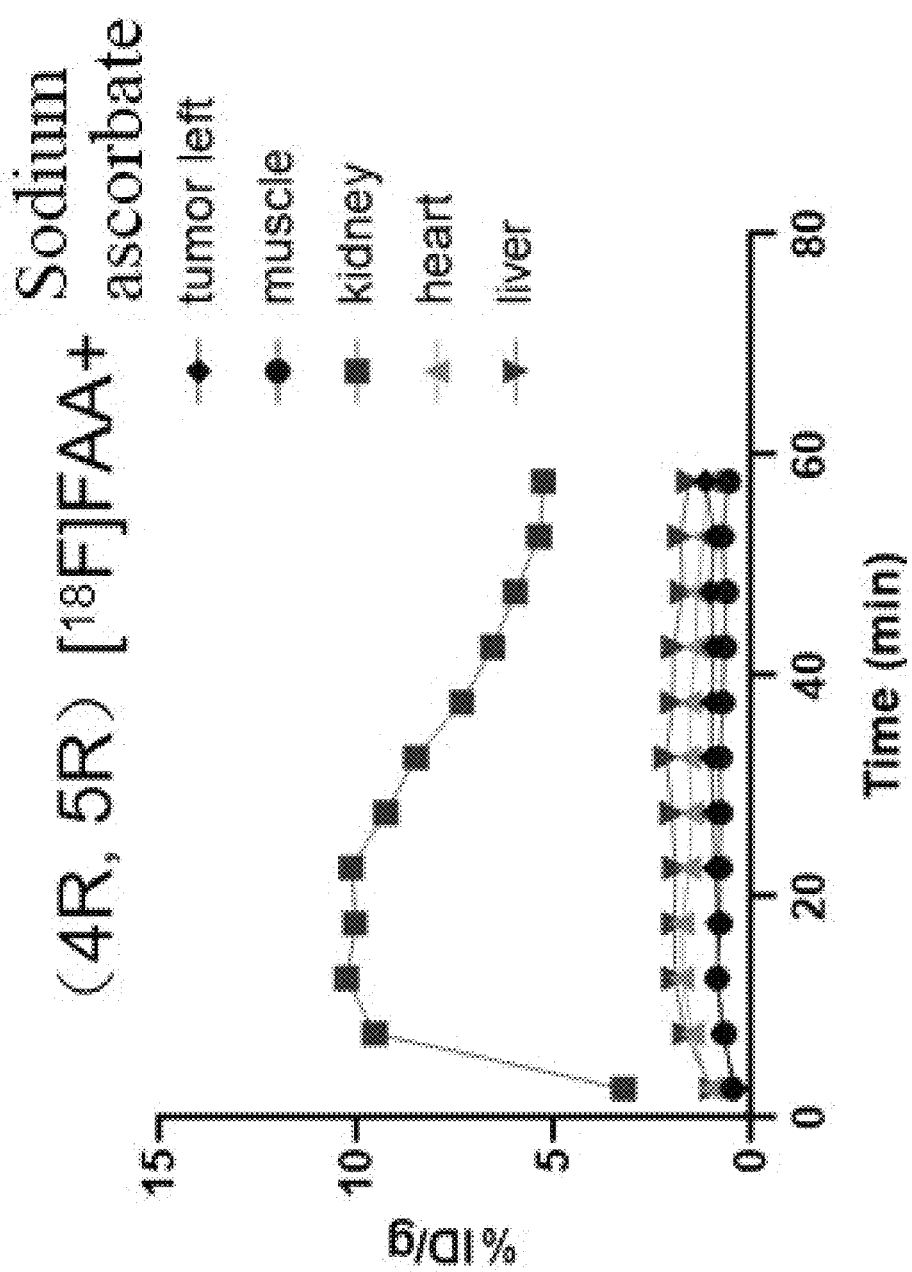
Figure 7:
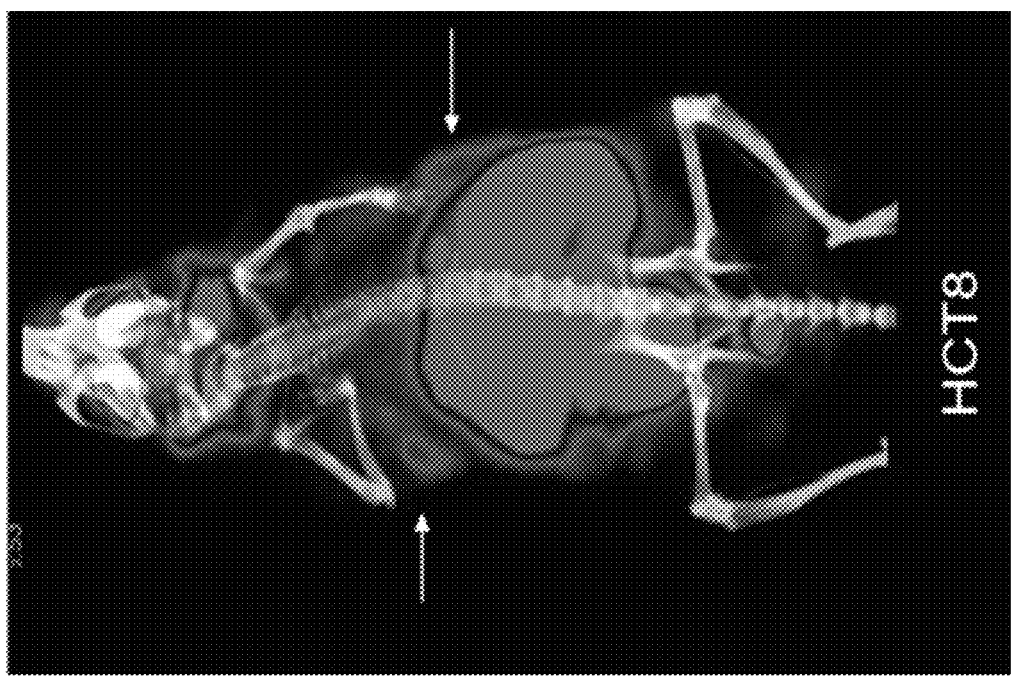
FIG. 7 shows the graph of static imaging upon tail vein injection of the tumor-bearing mice in Example 4 of the present disclosure.

Static micro-PET/CT imaging was performed 1 hour after tail vein injection in the anesthetized tumor-bearing mice. The dynamic image and delayed image obtained upon the intratumoral injection of the tumor-bearing mice are shown in FIGS. 6A-6C. The static image obtained upon the tail vein injection of the tumor-bearing mice is shown in FIG. 7.

In the dynamic imaging upon intra-tumoral injection, the imaging agent (4R, 5R)[$^{18}$F]FAA aggregates in the tumor and is absorbed into the systemic circulation through the tumor tissue and excreted by the liver and kidneys, and the addition of supersaturated sodium ascorbate significantly inhibits the metabolism of (4R, 5R) [$^{18}$F]FAA in the liver. The SUVmax (% ID/g) of (4R, 5R)[$^{18}$F]FAA in the tumor with/without the addition of supersaturated sodium ascorbate was 165 and 88 at 5 min after injection, respectively. With or without adding supersaturated sodium ascorbate by the intratumoral injection, the SUVmax (% ID/g) of the tumors in mice visualized 1h upon the rail vain injection of (4R, 5R)[$^{18}$F]FAA was 45, 34, and 6.3, respectively. Without addition of supersaturated sodium ascorbate, the SUVmax (% ID/g) of tumors in mice delayed visualized 2 h after intratumoral injection of (4R, 5R)[$^{18}$F]FAA was 35. (4R, 5R)[$^{18}$F]FAA exhibited high uptake in tumors and is a good tumor tracer. Sodium ascorbate significantly inhibited the metabolism of (4R, 5R)[$^{18}$F]FAA in the liver, but only partially inhibited tumor uptake, suggesting that (4R, 5R) [$^{18}$F]FAA upon the intratumoral injection enters the tumor cells via diffusion and transportation by transporters, and that intratumoral injection may increase the dose and retention time of AA in the tumor cells via diffusion.

Example 5: Use of (4R, 5R) [18F]FAA for Pet/Ct Dynamic Imaging of Tumor Patients Six patients with different tumors fasted and urinated for at least 6 hours prior to receiving PET/CT scanning, approximately 5, 13, 30, 45 and 60 minutes after injection of (4R, 5R)[$^{18}$F]FAA (mean 448±113 MBq), the five consecutive whole-body dynamic PET/CT scanning was conducted for each participant using a uMI 780 scanner (United Imaging Healthcare) or Discovery MI scanner (GE Healthcore). The CT acquisition parameters of the uMI 780 scanner were 120 kV, smart 100-200 mAs, detector coverage of 40 mm, spacing of 0.9875, slice thickness of 1.0 mm, and rotation time of 0.5 s. The PET emission scan time was 1.5 min per bed with 6 beds covering the scanning area. Finally, the PET images were reconstructed by the regularized ordered subset expectation maximization algorithm (R-OSEM, UNITED IMAGING) with attenuation normalization using ACCT images. The CT acquisition parameters of the Discovery MI scanner were 120 kV, smart 120-180 mA, detector coverage of 40 mm, slice thickness of 0.625 mm, pitch to speed of 0.984:1, 39.37 and rotation time of 0.6 s. The PET emission scanning time was 1 min per bed with 6 to 8 beds covering the scanning area. Finally, the PET images were reconstructed by a Bayesian penalized likelihood (BPL) reconstruction algorithm (Q.clear, GE Healthcare) and attenuation nominalization was performed using ACCT images. Urine samples were collected after the last PET/CT scan and total radioactivity of the urine was assessed.

Figure 8:
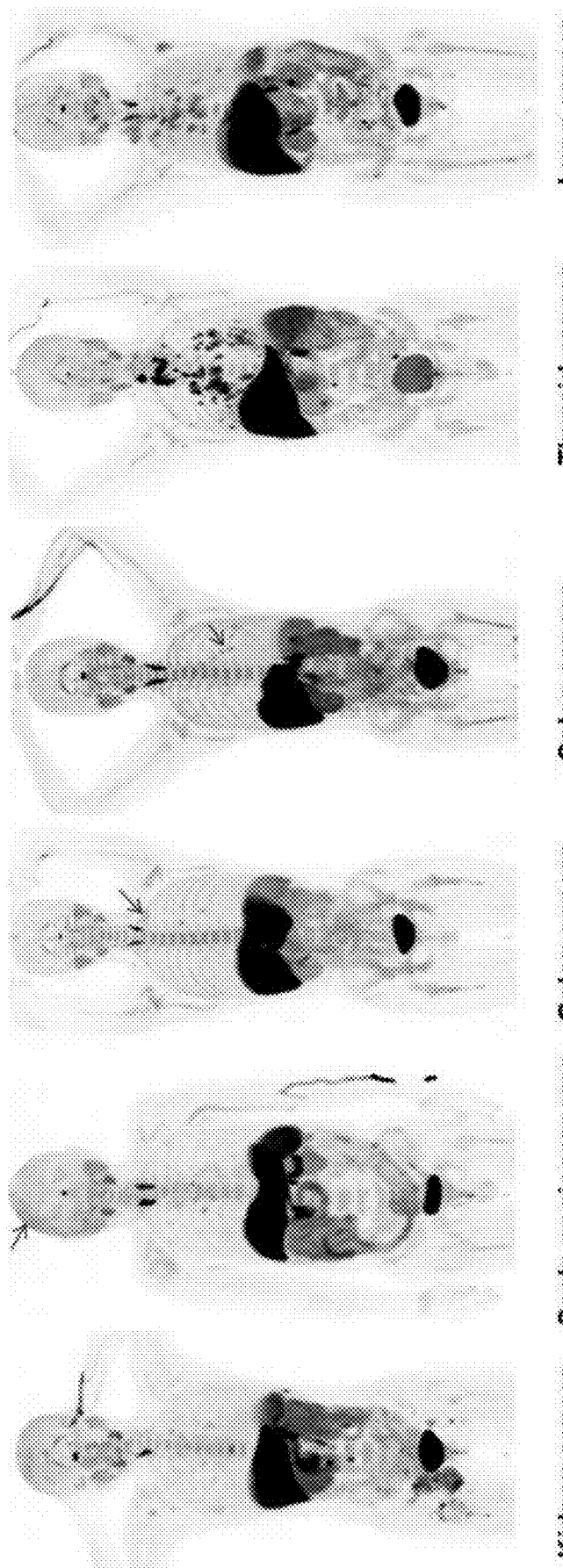
FIG. 8 shows PET/CT images of patients with different tumors in Example 5 of the present disclosure.
Figure 9:
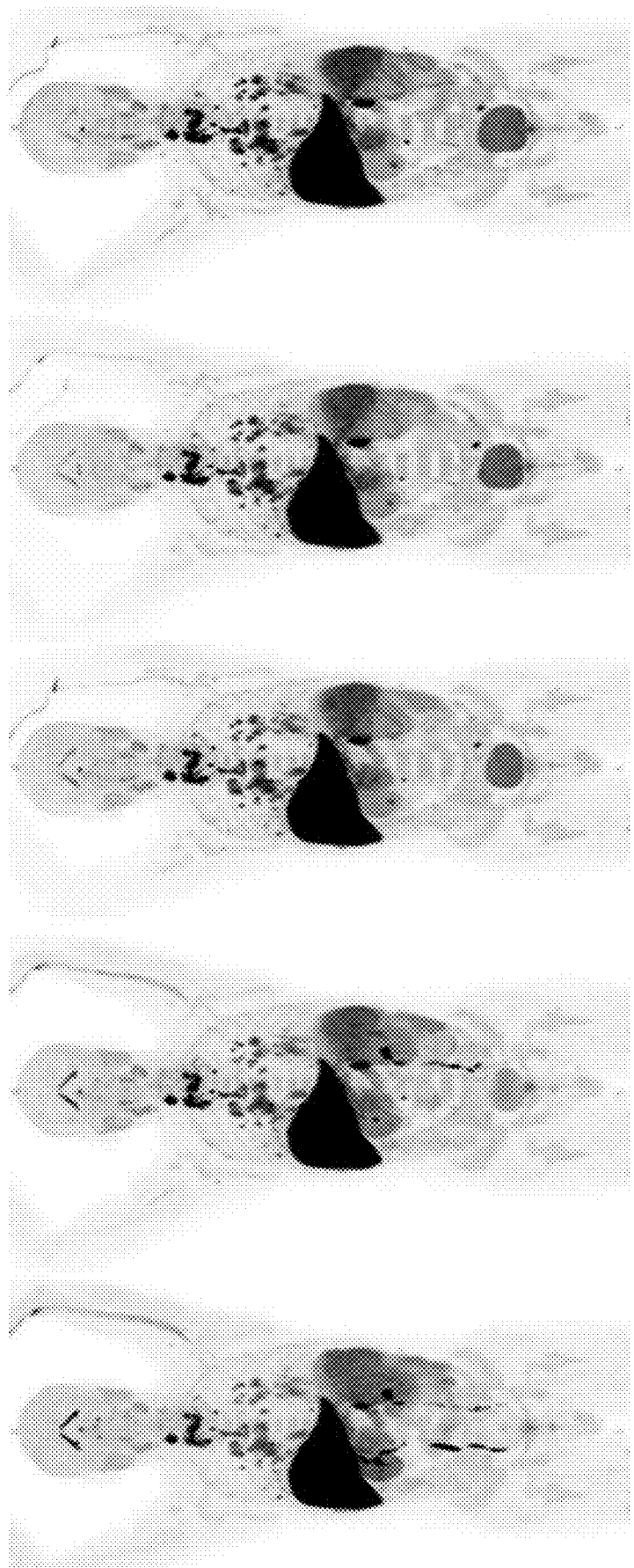
FIG. 9 shows the dynamic PET/CT image of a patient with the postoperative systemic multiple metastases of thyroid cancer in Example 5 of the present disclosure.
Figure 10A:
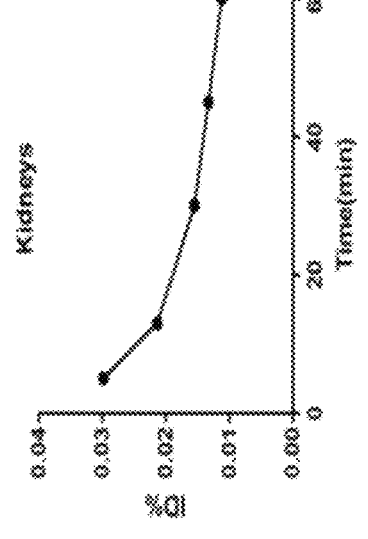
FIGS. 10A-10I show the mean time-activity profile of major organs in Example 6 of the present disclosure.
Figure 10B:
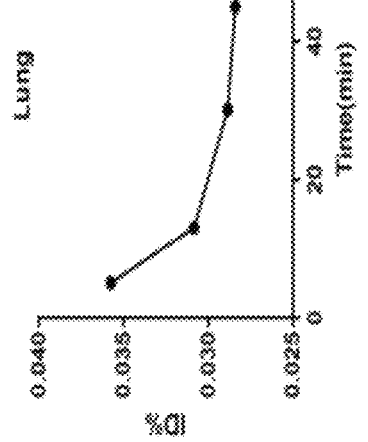
Figure 10C:
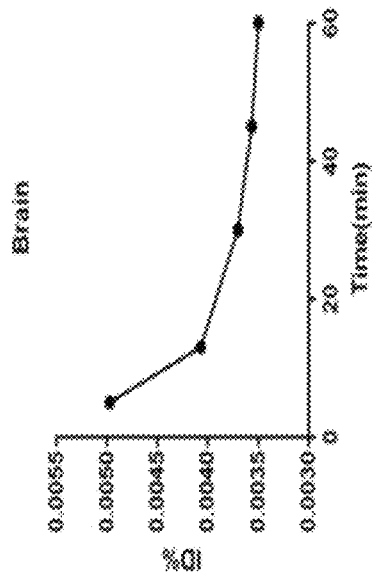
Figure 10D:
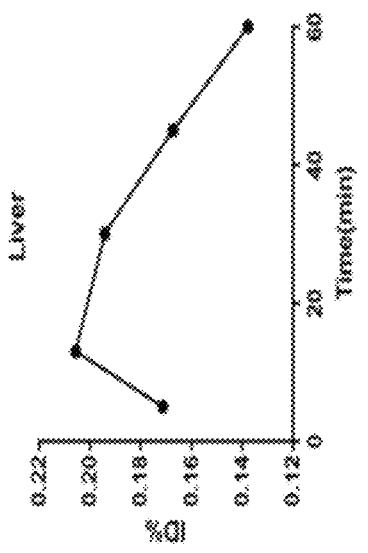
Figure 10E:
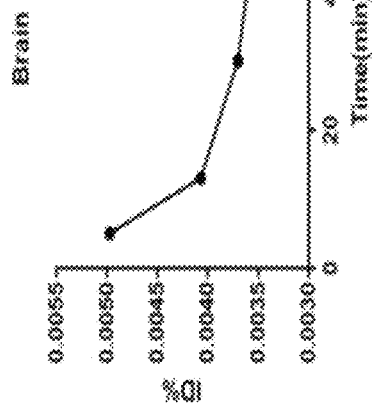
Figure 10F:
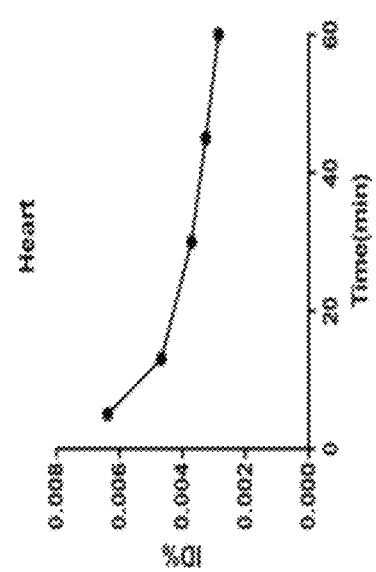
Figure 10I:
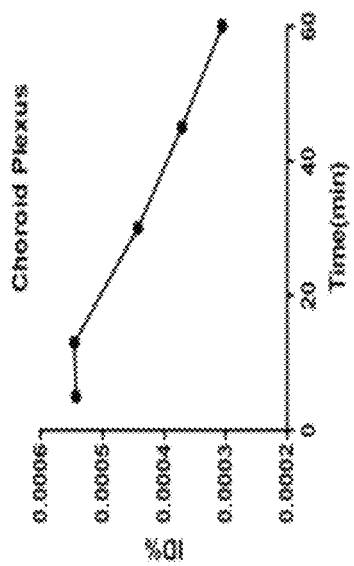
Figure 10H:
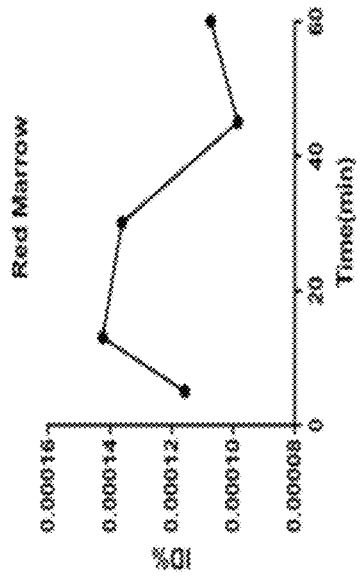
Figure 10G:
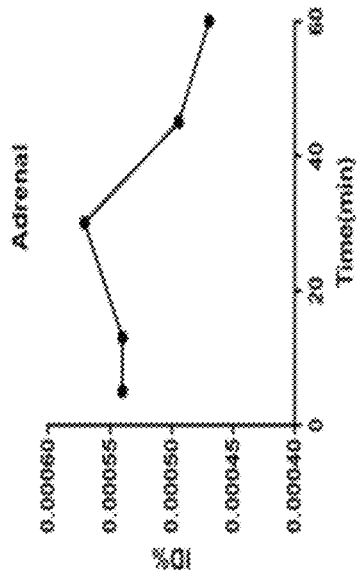

PET/CT images of patients with different tumors are shown in FIG. 8. The dynamic PET/CT image of the patient with postoperative systemic multiple metastases of the thyroid cancer is shown in FIG. 9. Good contrast between tumor and background resulted in good tumor imaging, wherein (4R, 5R) [$^{18}$F]FAA in 6 patients detected 2 primary lesions and 168 metastases, besides 6 liver metastases. The mean SUVmax of (4R, 5R)[$^{18}$F]FAA in all tumor lesions was 6.89±3.82 (range 1.62-22.85, median 6.07). The radioactive uptake of (4R, 5R)[$^{18}$F]FAA in tumor lesions increased rapidly and steadily over time. (4R, 5R)[$^{18}$F]FAA is safe for use in humans and exhibits high uptake in tumors.

Example 6: Biodistribution in Human Body

For the 6 sets of images obtained by Example 5, the ROI was depicted in the whole body images at the first time point and replicated to subsequent time point scans so as to determine the cumulative radioactivity in each source organ. The genital volume was manually adjusted if necessary. Major source organs include brain, thyroid, lung, heart wall, liver, gallbladder, stomach, adrenals, kidneys, pancreas, spleen, uterus (female only), testes (male only), and bone marrow. The biodistribution analysis included muscle and the absorbed dose analysis included bladder. Spinal ROIs were plotted as an alternative to the red bone marrow. Time-activity profiles were derived from each ROI, and cumulative radioactivity for each source organ was expressed as a percentage of the injected dose (% ID).

The average time-activity profiles for the major organs are shown in FIGS. 10A-10I. The results show that all the subjects exhibit similar biodistribution characteristics. At the earliest imaging time point, most subjects had high uptake of [$^{18}$F]FAA in the liver, adrenal glands, kidneys, choroid plexus, pituitary gland, and thyroid. With the exception of the kidney, these organs continued to exhibit high uptake 1 h after injection of (4R, 5R)[$^{18}$F]FAA. (4R, 5R)[$^{18}$F]FAA exhibited moderate uptake in the spleen, intestine, salivary glands, and bone marrow, with slow clearance of the tracer over time. The tracer is excreted mainly through the kidneys to the bladder, where the accumulation of activity in the bladder gradually increases over time. Uptake in the heart, muscle and brain remained low during the imaging phase. The activity decreases exponentially in most organs and can be fitted with mono- or bi-exponential functions. (4R, 5R) [$^{18}$F]FAA shows a similar biodistribution pattern to AA in human body and exhibits high uptake and retention with appropriate kinetics in tumors.

Example 7: Radiometrics

For the six sets of data obtained through Example 6, the residence times were calculated as the area under each time-activity curve by curve fitting with either a mono-or bi-exponential function model. The residence times of the bladder were generated by the integration of the time-activity curve from zero time to the last emission scan time plus the integration of the function from the last scan time to infinity (physical decay only). These residence times are then used for radiation absorbed dose calculations. The radiation absorbed dose was calculated for each subject using the Medical Internal Radiation Dose (MIRD) algorithm. The absorbed dose in the target area specified by MIRD was calculated according to the standardized Cristy Eckerman 70 kg adult male model, and the effective dose was assessed according to the tissue weighting factors in the publication of International Commission on Radiological Protection.

The (4R, 5R) [$^{18}$F] FAA residence schedules for the major organs are shown in FIG. 11, and the radiation dose estimation table is shown in FIG. 12. The results showed that the organ with the longest residence time was the liver with 22.5±4.94 E-02 hours, followed by the lung (3.18±0.49 E-02 hours), spleen (2.19±1.59 E-02 hours), kidney (1.77±0.53 E-03 hours) and bladder wall (1.16±0.54E-03 hours). The thymus had the lowest residence time (2.74±1.37E-05 h) and the residence time in the whole body was 9.87±2.75E. The organs with the highest absorbed dose were the liver (3.42±0.75E-02 mGy/MBq), spleen (2.95±1.70E-02 mGy/MBq), adrenal gland (1.89±0.61E-02 mGy/MBq) and kidney (1.87±0.38E-02 mGy/MBq), and the organs with lowest absorbed dose was brain (4.88±1.21E-03 mGy/MBq). The mean systemic absorbed dose was 6.54±1.58E-03 mSv/MBq. The mean effective dose (ED) was 1.68±0.36E-02 mSv/MBq. The systemic absorbed effective dose of (4R, 5R) [$^{18}$F]FAA was similar to that of the most widely used PET tracer [$^{18}$F]FDG (1.90±0.36 E-02 mSv/MBq).

The above descriptions are a preferred embodiment of the present invention, and it should be noted that for a person of ordinary skill in the art, several improvements and modifications can be made without departing from the principles described herein, and these improvements and modifications should also be considered within the scope of protection of the present disclosure.

What is claimed is:
1. A preparation method of a chiral pure radioactive compound (4R, 5R) [$^{18}$F] FAA for diagnostic or detection of cancer, comprising:

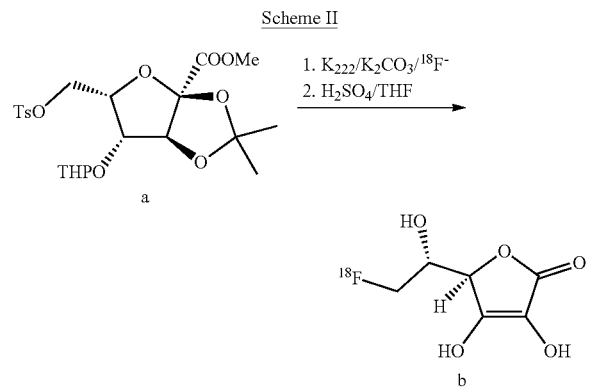

Scheme II 1) dissolving the compound (a) shown in the Scheme II in anhydrous acetonitrile to obtain a precursor-containing anhydrous acetonitrile;
2) mixing the precursor-containing anhydrous acetonitrile with a K2.2.2/K$_2$CO$_3$ solid having $^{18}$F, then heating a resulting mixture at 80° C. for 10 min, blowing out solvent with nitrogen at 110° C., and then, adding tetrahydrofuran as well as a concentrated sulfuric acid to a heated reactor and heating a resulting reactant at 110° C. for 10 min to obtain a labeled solution; wherein the tetrahydrofuran: the concentrated sulfuric acid is 1:1 by volume;
3) after completion of a reaction, cooling the labeled solution to 0° C. in an ice water bath, adding 1 N of sodium hydroxide solution to the labeled solution until a pH is between 3-4, or mixing with PBS to obtain a mixed solution;
4) separating the mixed solution using an alumina solid phase extraction column and a semi-preparative column to obtain the chiral pure radioactive compound (4R, 5R) [$^{18}$F] FAA (b); the separating is carried out with pH 3.6, 50 mM sodium acetate solution as a mobile phase at a flow rate of 3 mL/min,
wherein the preparation method is done by automation based on a module, the module comprising a solid-phase extraction column configured for eluting $^{18}$F$^-$; a syringe loaded with K2.2.2/K$_2$CO$_3$ solution; the heated reactor configured for heating the resulting mixture to evaporate water; a reagent bottle loaded with the compound (a); a buffer bottle loaded with buffer solution; and the semi-preparative column and the aluminum oxide solid phase extraction column configured for separating the mixed solution.

2. The preparation method according to claim 1, wherein the compound a:

anhydrous acetonitrile is 20:3 in mg:mL.

3. The preparation method according to claim 1, wherein the K2.2.2/$K_2CO_3$ solid having $^{18}F$ is obtained by adsorbing $^{18}F$ on a QMA solid phase extraction column and then collecting by eluting the QMA solid phase extraction column with a elution solution to obtain a K2.2.2/K2CO3 solution having $^{18}F$, then distilling off azeotropically with anhydrous acetonitrile by heating under nitrogen flow; wherein the elution solution is obtained by dissolving 10 mg K2.2.2 and 1.8 mg $K_2CO_3$ in 0.84 mL anhydrous acetonitrile and 0.16 mL water; the K2.2.2: $K_2CO_3$: anhydrous acetonitrile: water is 250:45: 21:4 in mg:mg:mL:mL.

4. The preparation method according to claim 1, wherein the preparation method further comprises determination of purity in a high performance liquid chromatography with a radioactive detector upon obtaining the radioactive compound (4R, 5R) [$^{18}F$] FAA.

5. The preparation method according to claim 4, wherein the determination of purity comprises:

a first mobile phase of an aqueous solution of 0.1% trifluoroacetic acid, a second mobile phase of an acetonitrile solution, and a gradient elution condition: 0-15 min, 95% of the first mobile phase, 5% of the second mobile phase; a flow rate of the first mobile phase and the second mobile phase is 1 mL/min.

* * * * *